(12) United States Patent
Crosby et al.

(10) Patent No.: US 12,718,715 B2
(45) Date of Patent: Aug. 25, 2026

(54) DETACHABLE DOCUMENTATION HOLDER SYSTEM AND METHODS OF MAKING AND USING SAME

(71) Applicants: Brian G. Crosby, Tunkhannock, PA (US); Noelle M. Martino, Tunkhannock, PA (US)

(72) Inventors: Brian G. Crosby, Tunkhannock, PA (US); Noelle M. Martino, Tunkhannock, PA (US)

( * ) Notice: Subject to any disclaimer, the term of this patent is extended or adjusted under 35 U.S.C. 154(b) by 0 days.

(21) Appl. No.: 18/908,744

(22) Filed: Oct. 7, 2024

(65) Prior Publication Data

US 2025/0166528 A1 May 22, 2025

Related U.S. Application Data

(60) Provisional application No. 63/600,223, filed on Nov. 17, 2023.

(51) Int. Cl.

*F16M 11/00* (2006.01)
*B60R 7/06* (2006.01)
*G09F 7/20* (2006.01)
*B60R 11/00* (2006.01)
*G09F 7/18* (2006.01)

(52) U.S. Cl.

CPC .................. *G09F 7/20* (2013.01); *B60R 7/06* (2013.01); *B60R 2011/0008* (2013.01); *B60R 2011/005* (2013.01); *B60R 2011/0059* (2013.01); *G09F 2007/1865* (2013.01)

(58) Field of Classification Search

CPC ..... G09F 7/20; G09F 2007/1865; B60R 7/06; B60R 2011/0008; B60R 2011/005; B60R 2011/0059

See application file for complete search history.

(56) References Cited

U.S. PATENT DOCUMENTS

| | | | | |
|---|---|---|---|---|
| 6,823,910 | B1 * | 11/2004 | Elnekaveh | A45C 15/08 150/147 |
| 7,617,928 | B1 * | 11/2009 | Murphy | B65D 83/12 206/39 |
| 8,443,854 | B2 * | 5/2013 | Long | A45C 11/182 150/147 |
| 9,090,299 | B1 * | 7/2015 | Weiss | B62J 11/00 |
| 10,327,525 | B2 * | 6/2019 | Deng | A45F 5/021 |
| D864,092 | S | 10/2019 | Zhang | |
| D877,692 | S | 3/2020 | Egbufoama | |

OTHER PUBLICATIONS

“SaferReach” Car documents holder. https://www.etsy.com/shop/SaferReach?msockid=2ec6af9a8a6061be38afbc508b676015.

* cited by examiner

*Primary Examiner* — Amy J. Sterling

(74) *Attorney, Agent, or Firm* — James R. McDaniel; Lawrence P. Zale; Zale Patent Law, Inc.

(57) ABSTRACT

Systems, methods, and other embodiments for a detachable documentation holder system, including a case assembly, wherein the case assembly includes documentation removably retained within the case assembly, a dock assembly removably connected to one side of the case assembly, wherein the dock assembly is located over the documentation so that the documentation is not visible while being retained within the case assembly, and an adjustable clip assembly operatively connected to a first side of the dock assembly.

6 Claims, 19 Drawing Sheets

100
102
104
106
108
110
110
108

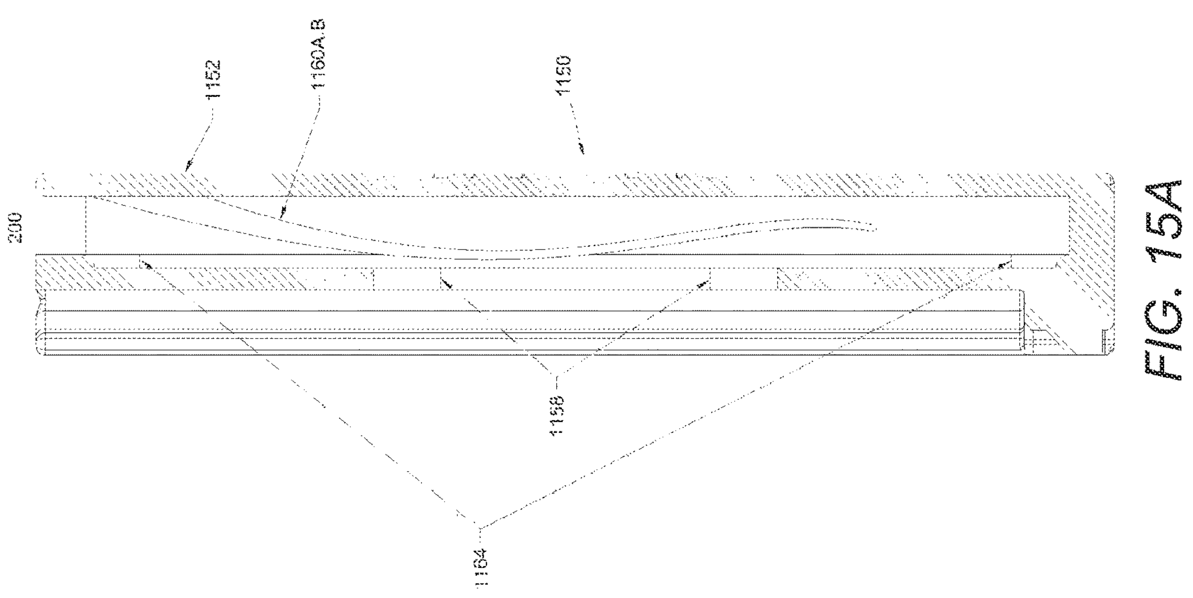
FIG. 15A
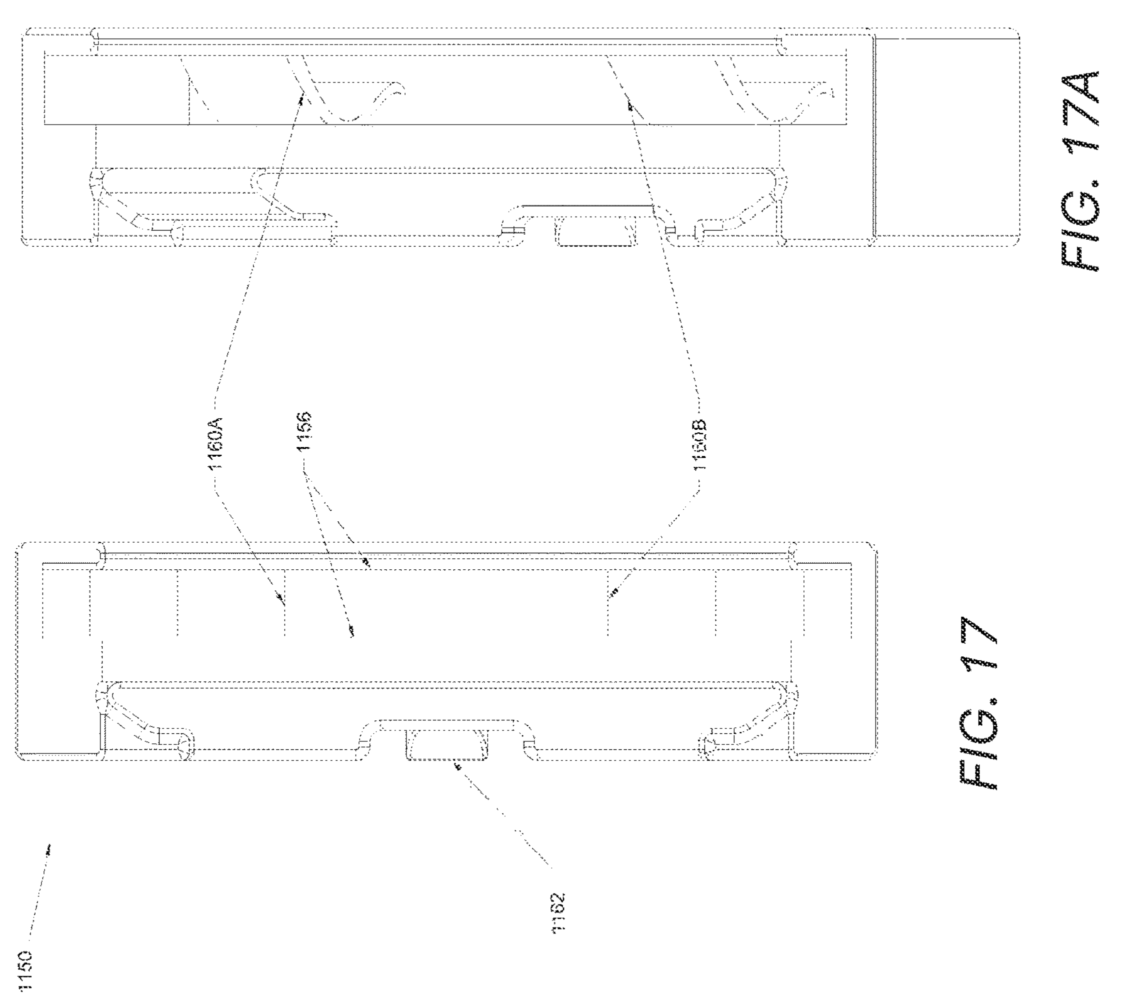
FIG. 17A
FIG. 17

1108
1150

1002
1008
1010
1004
1006

1002

1002
1062
1010
1004
1008
1150

A
1100
1102
1103
1106
1108
1109
1110
1112
1113
1116
1118

1102
1103
1106
1108
1109

B
1100
1102
1106
1112
1118

1102
1103
1106
1120
1122

DETACHABLE DOCUMENTATION HOLDER SYSTEM AND METHODS OF MAKING AND USING SAME

CROSS-REFERENCE TO RELATED APPLICATION

This application claims benefit of U.S. Patent Application 63/600,112, filed on Nov. 17, 2023, having the same title and inventors, the disclosure of which is hereby incorporated by reference in its entirety to provide continuity of disclosure to the extent such a disclosure is not inconsistent with the disclosure herein.

FIELD OF THE INVENTION

The present invention relates to a detachable documentation holder system. In particular, the detachable document holder system is used to retain documents such a driver's license, an automobile insurance card, an automobile registration, medical cards, or the like so that the documents can be easily stored, accessed, and presented to the proper authorities upon request. In one embodiment, the documentation holder system includes a removable rectangular case with an opening for inserting the documents. The rectangular case also includes a plurality of curved leaf springs to securely retain the documents within the rectangular case. Reflective tape is applied around the perimeter of the case to provide better visibility in low light situations. Reflective indicia such as a logo is centered on one side of the rectangular case to allow the proper authorities to see that the documentation holder system has been installed within a vehicle of the user of the documentation holder system. The case is attached to a removable dock assembly such that the removable dock assembly protects personal information on the documentation from view while further securing the documents in place on the documentation holder system. The dock assembly connects to a clip assembly through the use of a detachable clip assembly. The clip assembly is constructed to allow the case to rotate in multiple directions. The detachable clip assembly has two (2) prongs that provide tension, wherein at least one of the prongs includes a flat side. The detachable clip assembly includes a plurality of raised areas that allow the clip assembly to secure to a variety of surfaces and sizes of surfaces such as automobile air vents. The clip prongs fan out in opposite directions on the end for easy attachment and removal.

BACKGROUND OF THE INVENTION

It is known that when an automobile driver is pulled over by a law enforcement officer, the law enforcement officer will usually ask the automobile driver for a driver's license, proof of insurance, and an automobile's registration. Typically, the driver's license is kept in a wallet, or a purse and the automobile registration is kept in a glove compartment of the automobile.

It is also known that in some instances when the driver has been pulled over by the law enforcement officer, unfortunate incidents have occurred when the driver attempts to retrieve his/her driver's license and/or automobile registration. For example, if the driver attempts to retrieve his/her driver's license and/or automobile registration, this movement by the driver may cause the law enforcement officer to assume that the driver is attempting to access a weapon. In response to this perceived unlawful action by the driver, the law enforcement may draw his/her weapon, and possibly, discharge the weapon towards the driver which may result in devastating consequences.

In order to prevent or mitigate escalation of interactions with law enforcement, the need to reach for identification that is stored out of plain view should be eliminated which, in turn, reduces any unnecessary movement during the interaction.

Therefore, it would be desirable to provide a detachable documentation holder system that is within view at all times and is not easily confused with a weapon.

Furthermore, it is desired to provide a detachable documentation holder system that allows emergency responders to easily find the owner's identification or medical information pertinent to rendering aid should the owner be unresponsive.

This invention's purpose is to fulfill these and other needs in the documentation holder art in a manner more apparent to the skilled artisan once given the following disclosure.

The preferred detachable document holder system, according to various embodiments of the present invention, offers the following advantages: ease of use; portability; reduced cost; reduced weight; easy access to the documents; ease of identification of the document holder system; improved visibility of the document holder system; removability; ease of attachment of the case to the dock; ease of removal of the case from the dock; ease of attachment of the document holder to a surface; ease of removing the document holder from a surface; ease of storing the document within the case; and ease of securing the document within the case. In many of the preferred embodiments, these advantages are optimized to the extent that is considerably higher than previously achieved in prior known document holders.

BRIEF DESCRIPTION OF THE DRAWINGS

Some embodiments of the present invention are illustrated as an example and are not limited by the figures of the accompanying drawings, in which like references may indicate similar elements and in which:

FIG. 13 is an isometric, front view of the case assembly of the another embodiment for a detachable documentation holder system, according to various embodiments of the present invention described herein.

FIG. 14 is an isometric, rear view of the case assembly of another embodiment for a detachable documentation holder system, according to various embodiments of the present invention described herein.

FIG. 14A is an isometric, rear view of the case assembly of another embodiment for a detachable documentation holder system, according to various embodiments of the present invention described herein.

FIGS. 15 and 15A are cross-sectional views of the case assembly of embodiment for a detachable documentation holder system, taken along line 15, 15A-15, 15A in FIG. 13, according to various embodiments of the present invention described herein.

FIG. 16 is another cross-sectional view of the case assembly of the another embodiment for a detachable documentation holder system, taken along line 16-16 in FIG. 13, according to various embodiments of the present invention described herein.

FIG. 17 is a top view of the case assembly of another embodiment for a detachable documentation holder system, according to various embodiments of the present invention described herein.

FIG. 17A is an isometric, top view of the case assembly of another embodiment for a detachable documentation holder system, according to various embodiments of the present invention described herein.

DETAILED DESCRIPTION OF THE INVENTION

The terminology used herein is to describe particular embodiments only and is not intended to be limiting to the invention. As used herein, the term "and/or" includes any and all combinations of one or more of the associated listed items. As used herein, singular forms "a", "an", and "the" are intended to include the plural forms as well as the singular forms unless the context clearly indicates otherwise. It will be further understood that the terms "comprises" and/or "comprising," when used in this specification, specify the presence of stated features, steps, operations, elements, and/or components but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefits, and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

A new and unique documentation holder system for storing and accessing documents and methods for making and using are discussed herein. In the following description, for purposes of explanation, numerous specific details are set forth to provide a thorough understanding of the present invention. It will be evident, however, to one skilled in the art that the present invention may be practiced without these specific details.

The present disclosure is considered an exemplification of the invention and is not intended to limit the invention to the specific embodiments illustrated by the figures or description below.

The present invention will now be described by referencing the appended figures representing preferred embodiments. FIGS. 1-31 are illustrations of several embodiments of a detachable document holder system for storing and accessing documents.

First Embodiment of a Detachable Document Holder System

Dock Assembly

Figure 1:
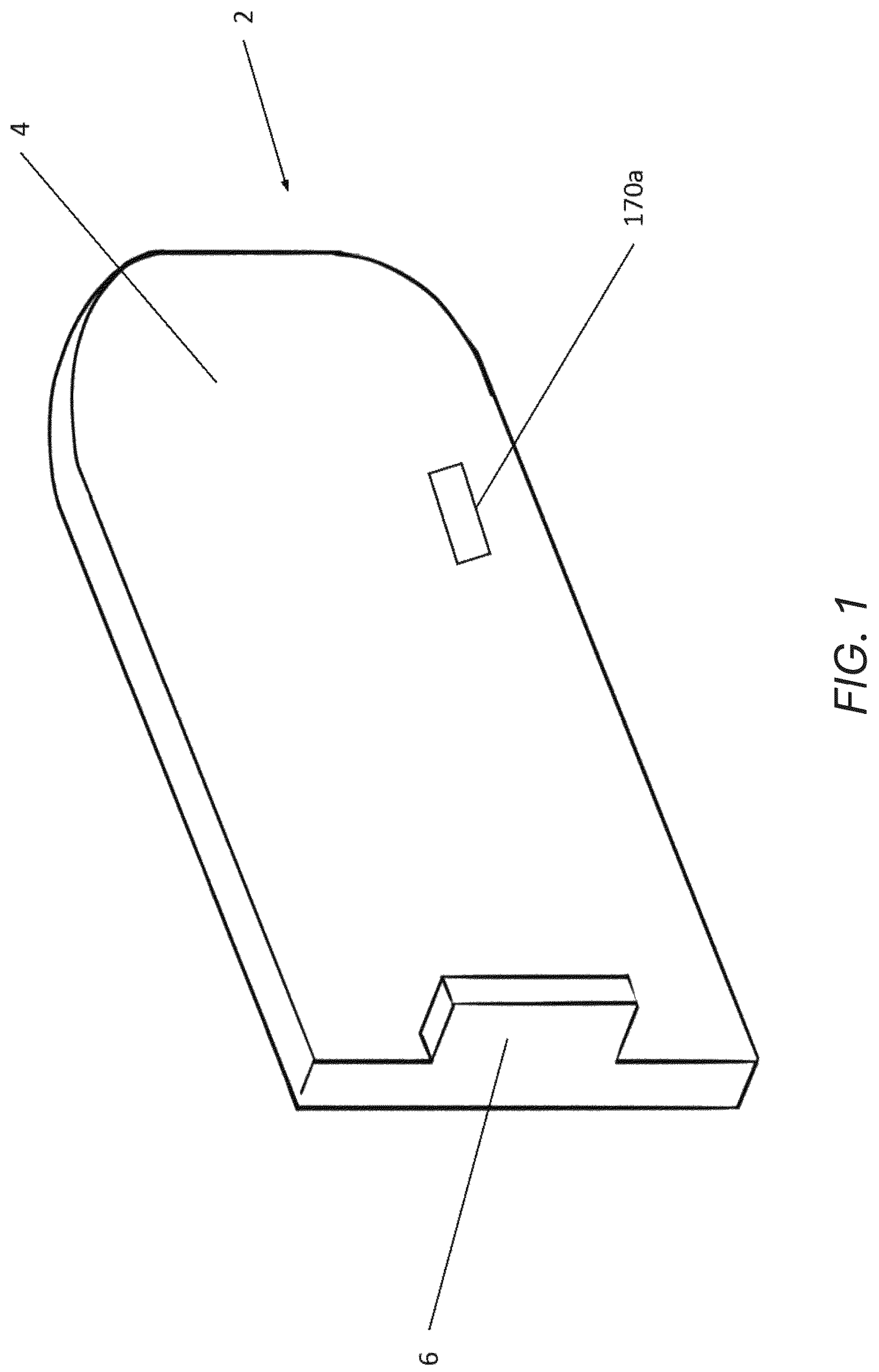
FIG. 1 is an isometric, front view of a dock assembly for a detachable documentation holder system, constructed according to various embodiments of the present invention described herein.
Figure 2:
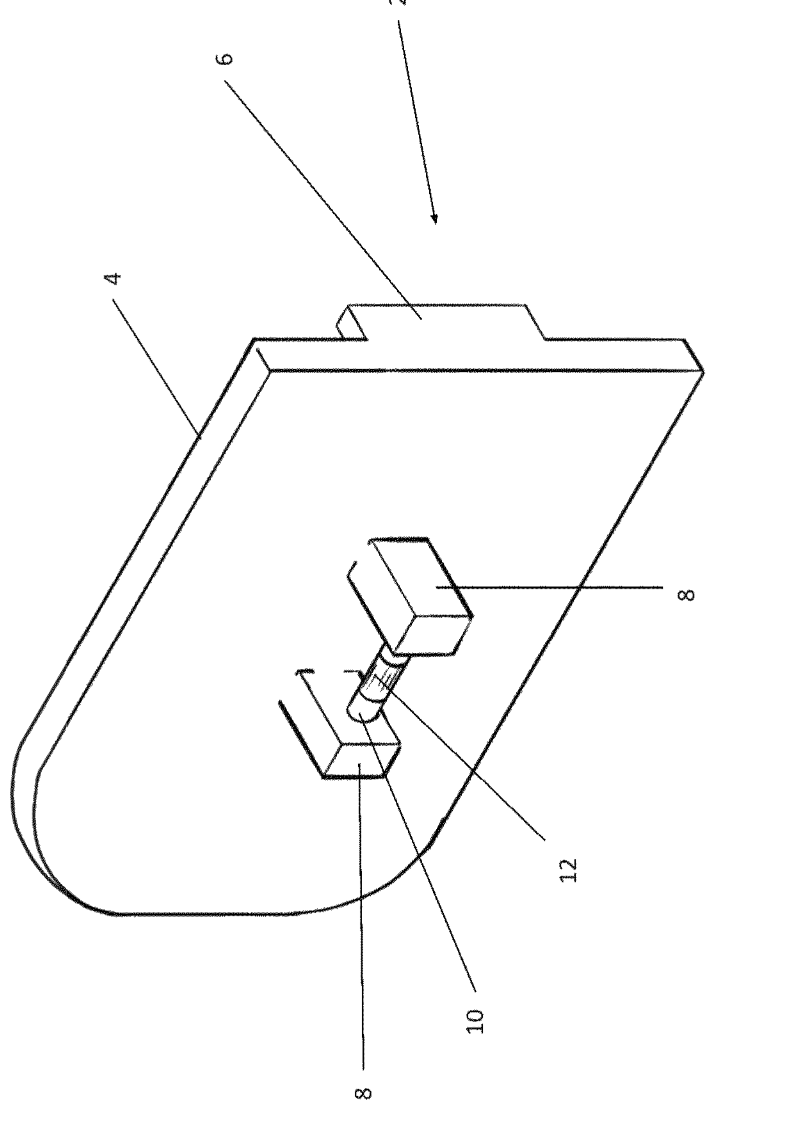
FIG. 2 is an isometric, rear view of the dock assembly for a detachable documentation holder system, constructed according to various embodiments of the present invention described herein.

As shown in FIGS. 1 and 2, there is illustrated a dock assembly 2. In particular, dock assembly 2 is constructed of any suitable, durable, high strength, rust resistant, UV resistant, lightweight material such as a polymeric or metallic material. Furthermore, in one embodiment, the dock assembly 2 (except sensor 170*a*) is constructed using conventional techniques such as molding, forming, grinding, or the like. In one embodiment, the dock assembly 2 could be constructed of a brightly colored (i.e., neon colored) material to further increase visibility of the dock assembly 2.

As shown in FIGS. 1 and 2, in one embodiment, dock assembly 2 includes, in part, base 4, toggle 6, extensions 8, and rod 10 having raised or corrugated areas 12 located around a perimeter of rod 10.

A unique aspect of the present invention is the use of raised or corrugated areas 12. As will be discussed in greater detail later, the raised or corrugated areas 12 are constructed so that they will interact with the raised or corrugated areas 53 (FIG. 3) on the stock assembly 50 in order to retain the dock assembly 2 in a desired position and/or orientation.

Stock Assembly

Figure 3:
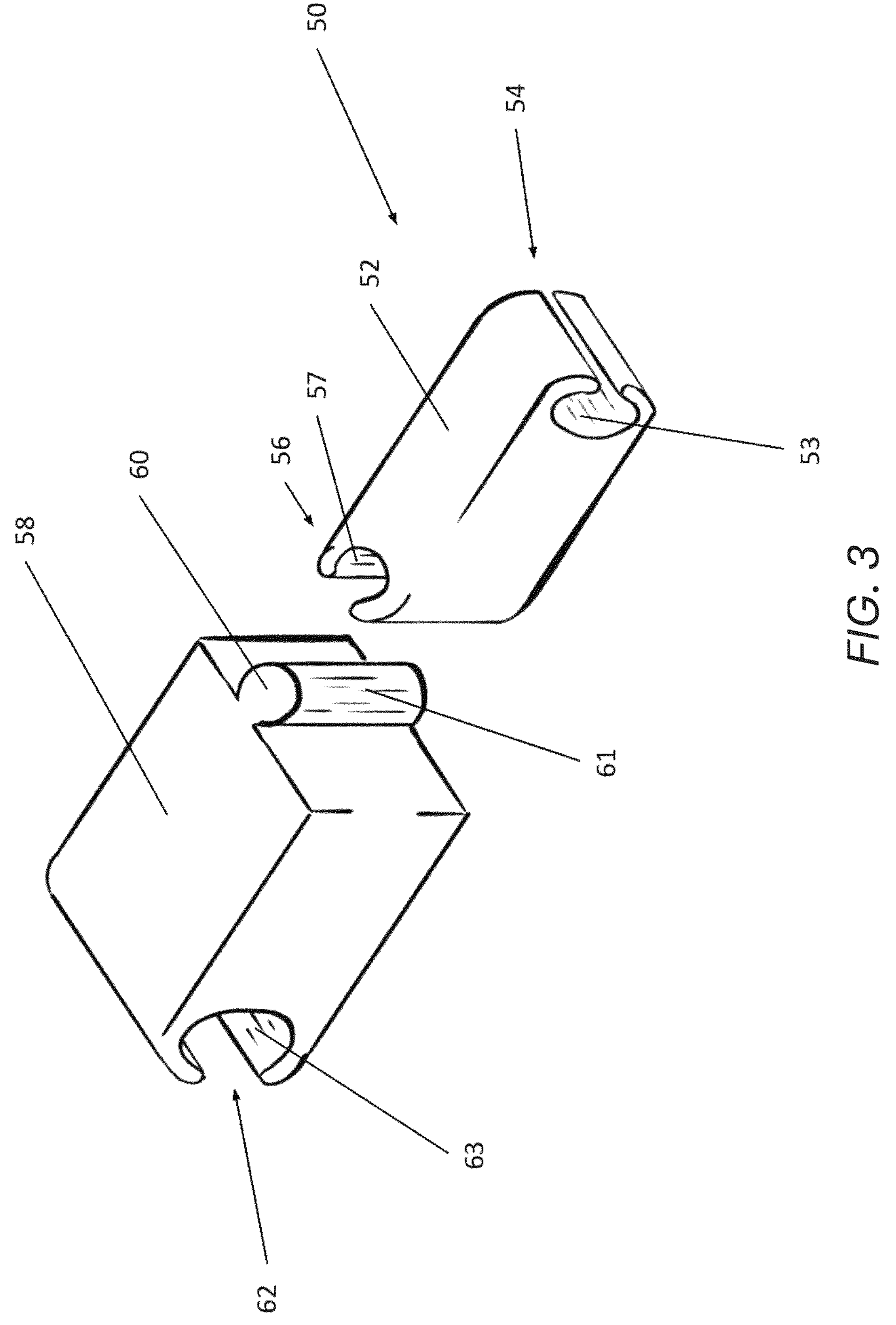
FIG. 3 is an isometric front view of a stock assembly for a detachable documentation holder system, according to various embodiments of the present invention described herein.

In particular, as shown in FIG. 3, there is illustrated a stock assembly 50. In particular, stock assembly 50 is constructed of any suitable, durable, high strength, rust resistant, UV resistant, lightweight material such as a polymeric or metallic material. Furthermore, in one embodiment, stock assembly 50 is constructed using conventional techniques such as molding, forming, grinding, or the like. In one embodiment, the stock assembly 50 could be constructed of a brightly colored (i.e., neon colored) material in order to further increase visibility of the stock assembly 50.

As shown in FIG. 3, in one embodiment, stock assembly 50 includes, in part, arm 52, slot 54 having raised or corrugated areas 53 located around a perimeter of slot 54, slot 56 having raised or corrugated areas 57 located around a perimeter of slot 56, arm 58, tab 60 having raised or corrugated areas 61 located around a perimeter of tab 60, and slot 62 having raised or corrugated areas 63 located around a perimeter of slot 62.

A unique aspect of the present invention is the use of raised or corrugated areas 53, 57, 61 and 63. As will be discussed in greater detail later, the raised or corrugated areas 53 are constructed so that they will interact with the raised or corrugated areas 12 (FIG. 2) on rod 10 in order to retain the dock assembly 2 in a desired position and/or orientation. Also, raised or corrugated areas 57 are constructed so that they will interact with the raised or corrugated areas 61 on arm 58 in order to retain arm 52 in a desired position and/or orientation. Finally, raised or corrugated areas 63 are constructed so that they will interact with the raised or corrugated areas 106 (FIG. 4) on rod 104 in order to retain the stock assembly 50 in a desired position and/or orientation.

Another unique aspect of the present invention is the use of arms 52 and 58. As will be discussed in greater detail later, arms 52 and 58 are constructed so as to be able to be adjusted in a variety of different directions (along the directions of arrows b in FIG. 9) and orientations so as to allow the case assembly 150 (FIGS. 8 and 9) to be located in a variety of different orientations and positions.

Clip Assembly

Figure 4:
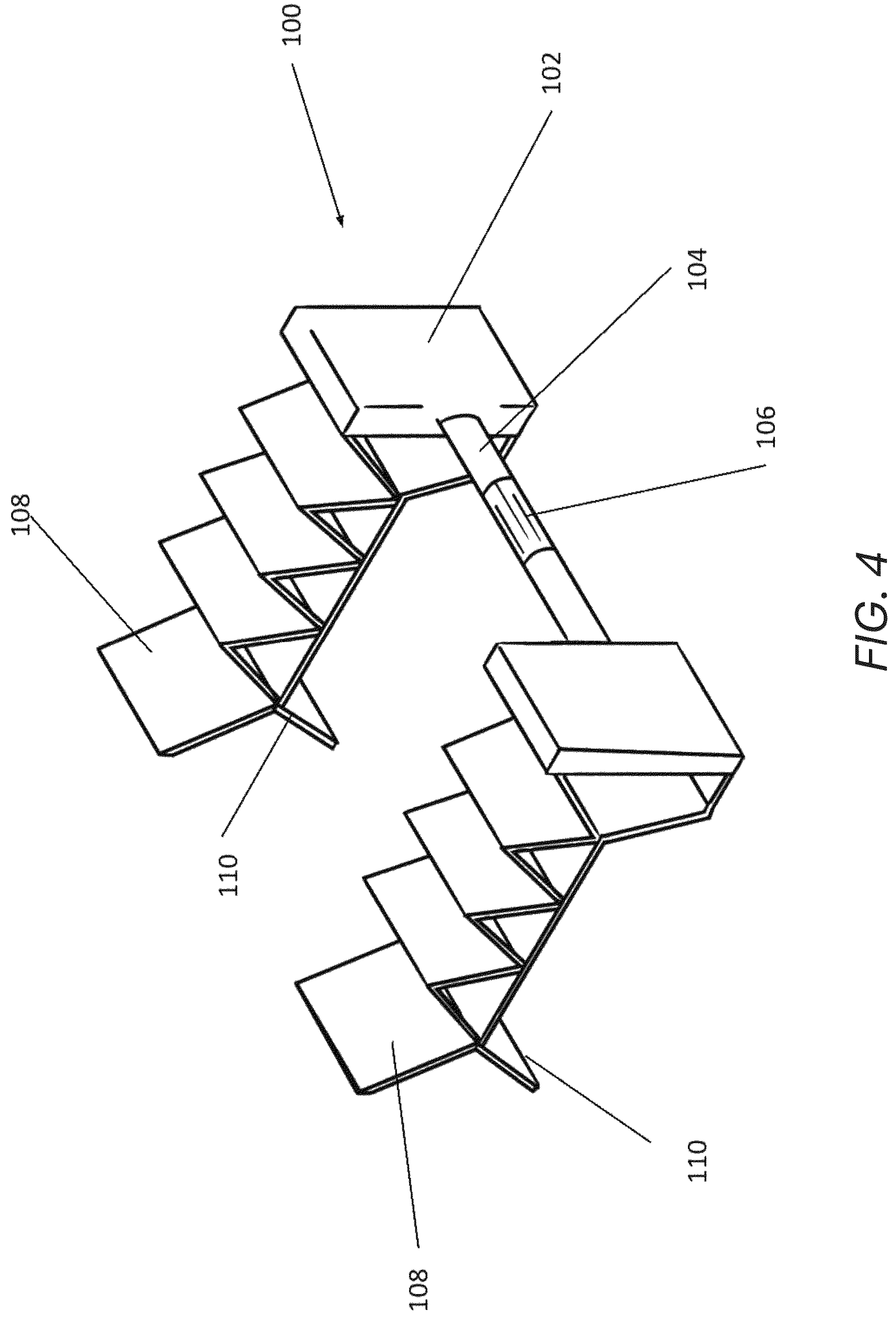
FIG. 4 is an isometric, top view of a clip assembly for a detachable documentation holder system, according to various embodiments of the present invention described herein.

As shown in FIG. 4, there is illustrated a clip assembly 100. In particular, clip assembly 100 is constructed of any suitable, durable, high strength, rust resistant, UV resistant, lightweight material such as a polymeric or metallic material. Furthermore, in one embodiment, clip assembly 100 is constructed using conventional techniques such as molding, forming, grinding, or the like. In one embodiment, the clip assembly 100 could be constructed of a brightly colored (i.e., neon colored) material in order to further increase visibility of the clip assembly 100.

As shown in FIG. 4, in one embodiment, clip assembly 100 includes, in part, brackets 102, rod 104 having raised or corrugated areas 106 located around a perimeter of rod 104, undulating clip arm 108, and straight clip arm 110.

A unique aspect of the present invention is the use of raised or corrugated areas 106. As will be discussed in greater detail later, the raised or corrugated areas 106 are constructed so that they will interact with the raised or corrugated areas 63 (FIG. 3) on slot 62 in order to retain the stock assembly 50 in a desired position and/or orientation.

Another unique aspect of the present invention is the use of undulating clip arm 108 and straight clip arm 110. As will be discussed in greater detail later, undulating clip arm 108 and straight clip arm 110 are constructed to allow the clip assembly 100 to secure the detachable documentation holder system 350 (FIGS. 8-10) to a variety of different surfaces and/or objects. Furthermore, the ends of clip arms 108 and 110 fan out in opposite directions for easy attachment and removal of the clip assembly 100.

Case Assembly

Figure 5:
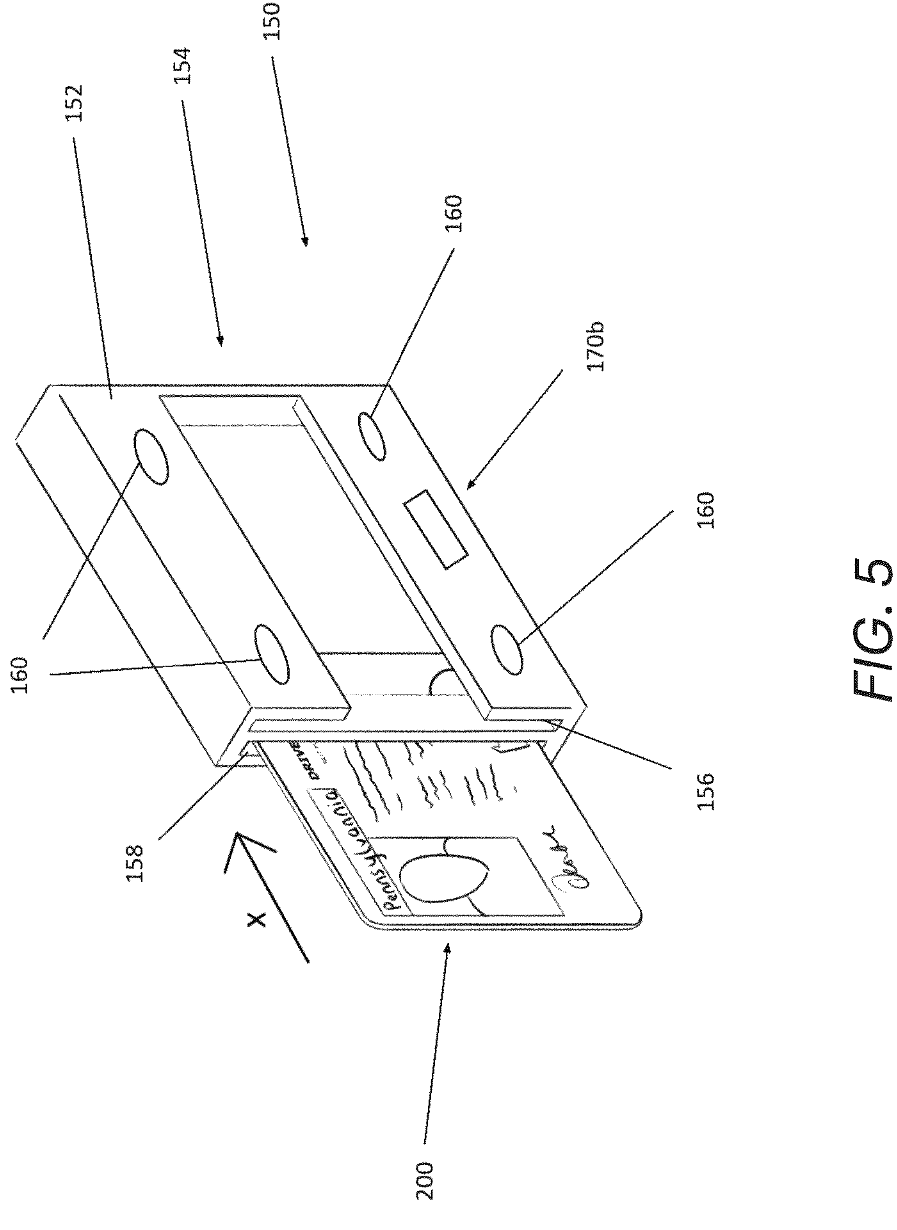
FIG. 5 is an isometric, rear view of a case assembly for a detachable documentation holder system, according to various embodiments of the present invention described herein.
Figure 6:
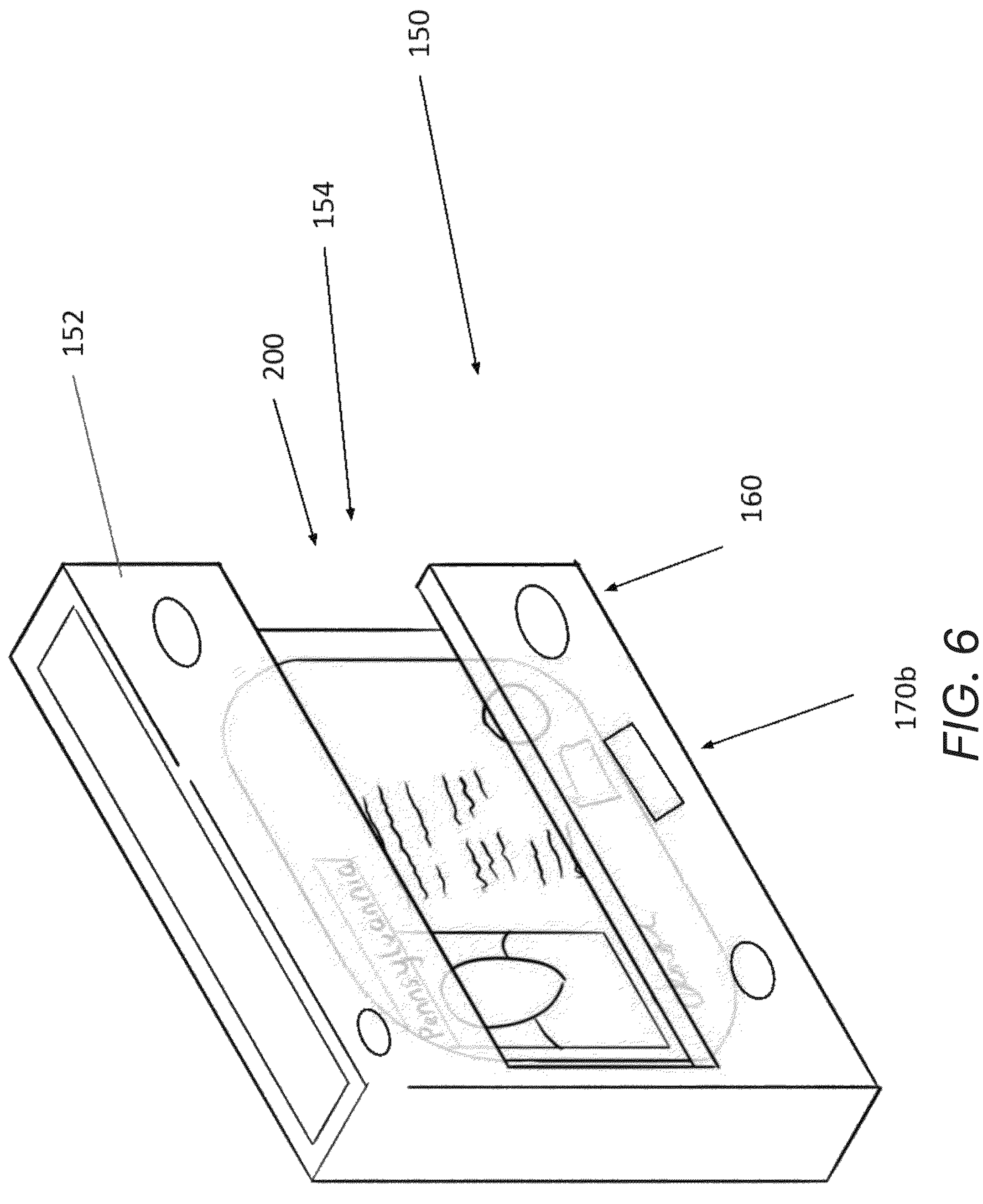
FIG. 6 is another isometric, rear view of the case assembly for a detachable documentation holder system with the documentation being located within the case, according to various embodiments of the present invention described herein.
Figure 7:
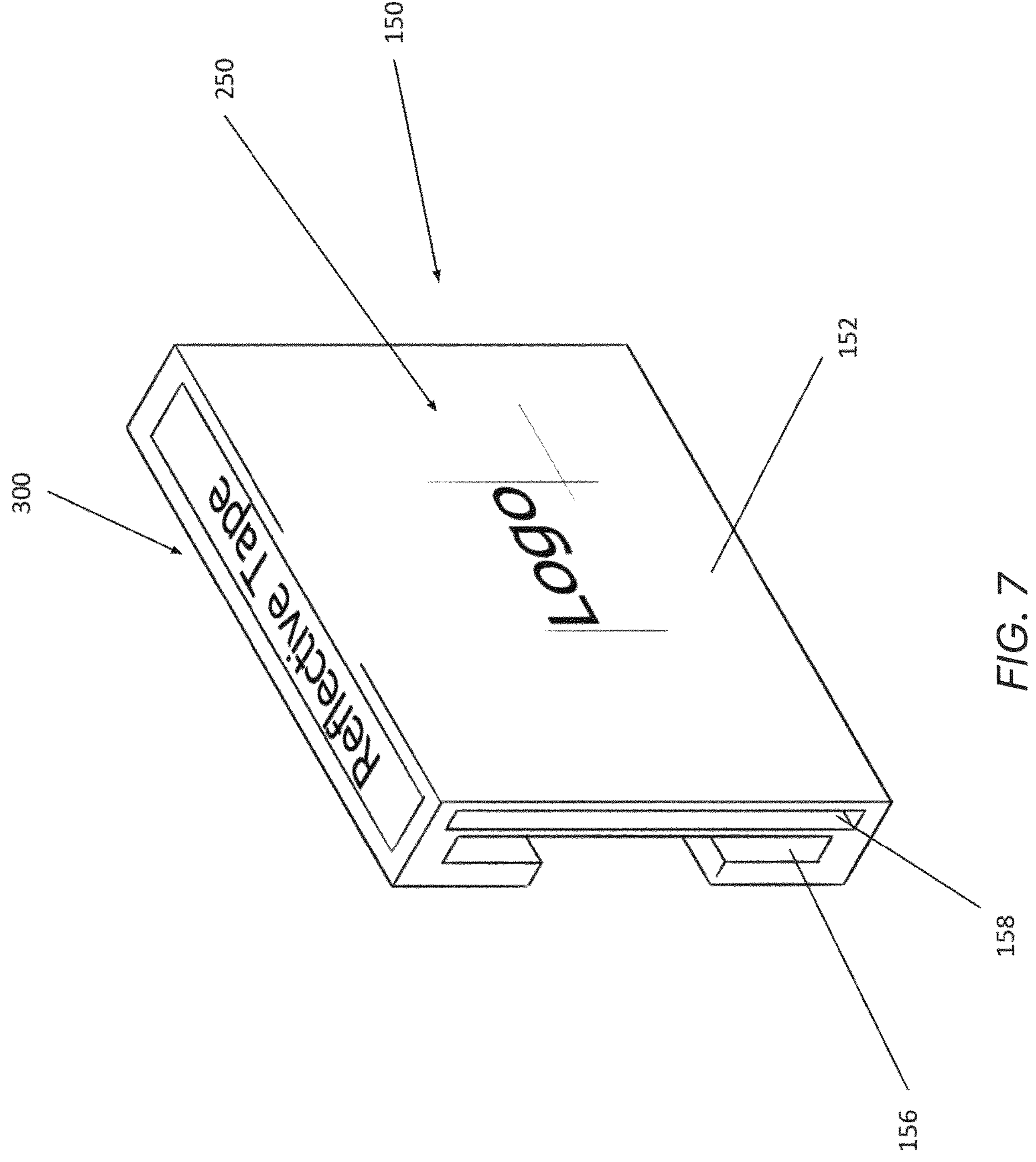
FIG. 7 is an isometric, front view of the case assembly for a detachable documentation holder system, according to various embodiments of the present invention described herein.

In particular, as shown in FIGS. 5-7, there is illustrated a case assembly 150. In particular, case assembly 150 is constructed of any suitable, durable, high strength, rust resistant, UV resistant, lightweight material such as a polymeric or metallic material. Furthermore, in one embodiment, case assembly 150 (except lighting 160 and sensor 170*b*) is constructed using conventional techniques such as molding, forming, grinding, or the like. In one embodiment, the case assembly 150 could be constructed of a brightly colored (i.e., neon colored) material in order to further increase visibility of the case assembly 150.

As shown in FIGS. 5 and 6, in one embodiment, case assembly 150 includes, in part, case 152, case opening 154, slot 156, slot 158, lighting 160, detachable documentation holder system removal sensor 170*b*, and documentation 200. It is to be understood that documentation 200 can be, but is not limited to, a conventional driver's license, a conventional automobile insurance card, a conventional automobile registration, conventional medical cards, or the like.

Figure 9:
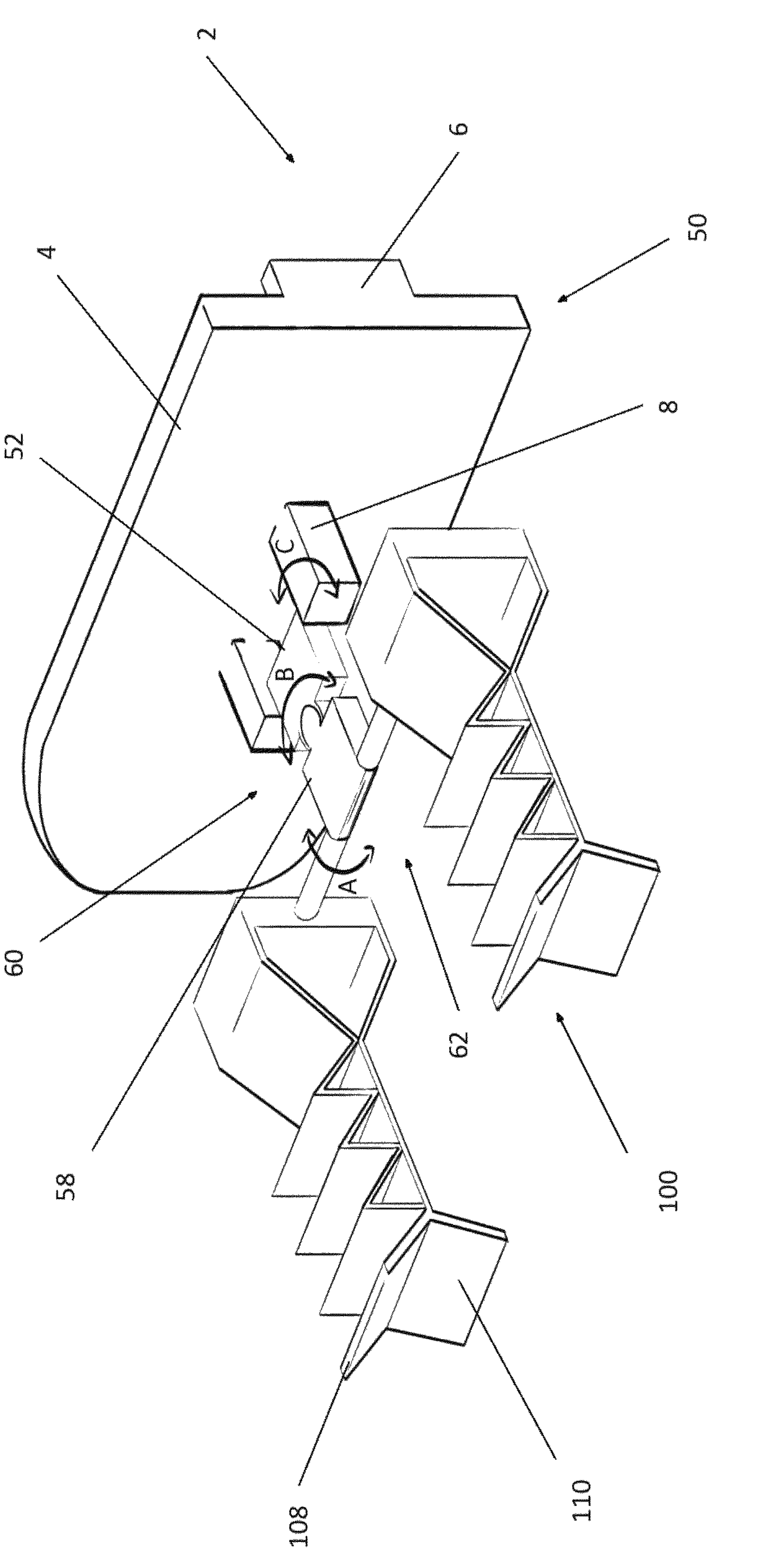
FIG. 9 is an isometric, rear view of the detachable documentation holder system, according to various embodiments of the present invention described herein.

A unique aspect of the present invention is the use of case opening 154 and slot 156. As will be discussed in greater detail later, slot 156 is sized and shaped to allow base 4 of dock assembly 2 (FIG. 1) to be removably retained within slot 156. As shown in FIG. 9, base 4 is removably retained within slot 156 so that the extensions 8 and rod 10 having raised or corrugated areas 12 located around a perimeter of rod 10 can be located within the case opening 154. In this manner, the dock assembly 2 can be removably attached to the stock assembly 50.

Another unique aspect of the present invention is the use of slot 158. Slot 158 is sized and shaped so as to be able to removably retain the documentation 200 within slot 158 (FIG. 6). It is to be understood that slot 158 should be constructed so that the documentation 200 can be easily and quickly inserted into and removed from the slot 158 (FIG. 5) along the directions of arrows X.

Still another unique aspect of the present invention is the use of lighting 160. Lighting 160 is located around the sides of the case 152 in order to illuminate the case 152 and the documentation 200 so as to assist law enforcement and first responders in more easily seeing the documentation 200 at night. As will be discussed in greater detail later, lighting 160 is electrically attached to electrical leads (not shown) in case assembly 150.

Figure 8:
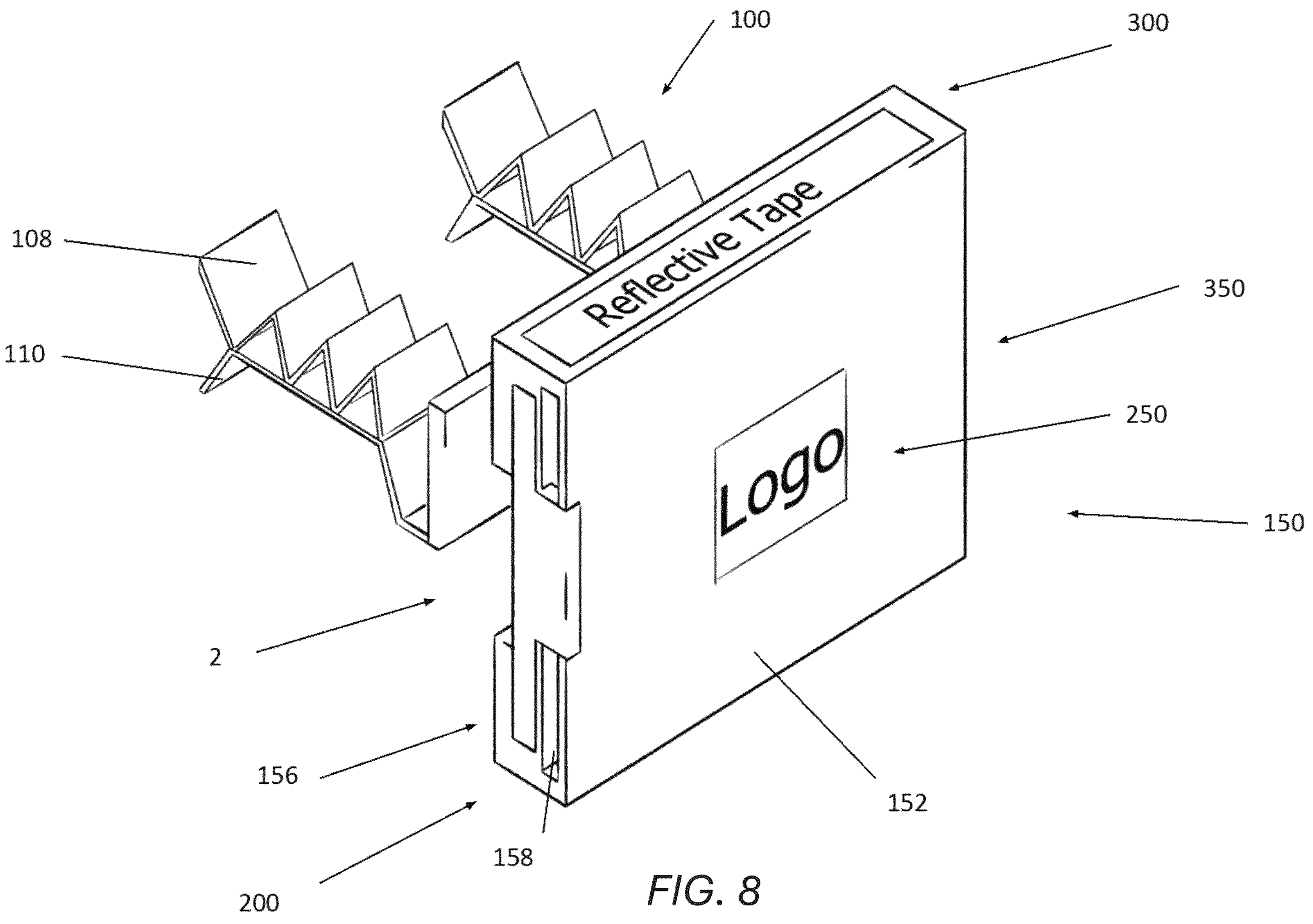
FIG. 8 is an isometric, front view of the detachable documentation holder system, according to various embodiments of the present invention described herein.
Figure 10:
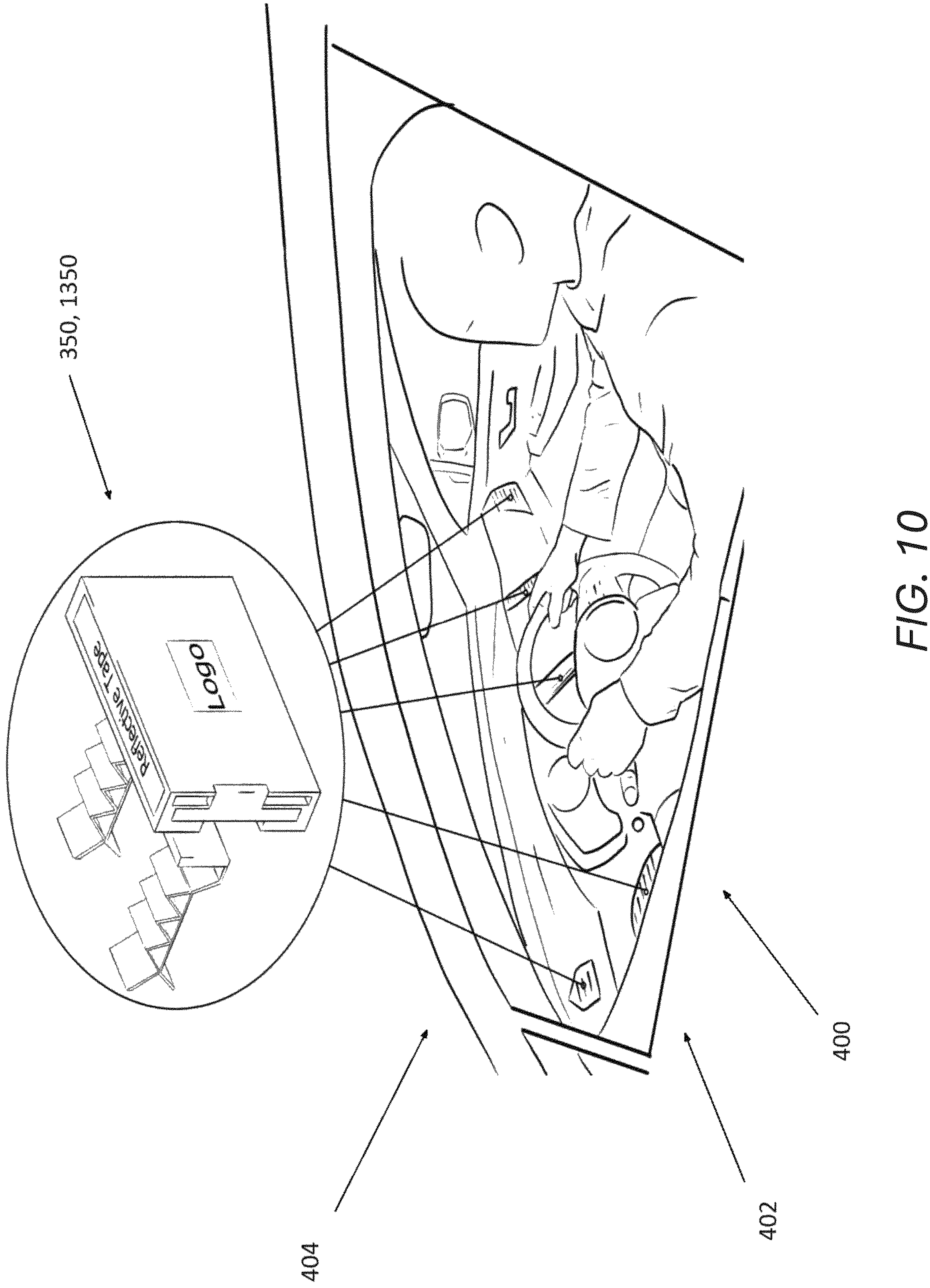
FIG. 10 is a schematic illustration of the various locations within an automobile where the detachable document holder system can be retained, according to various embodiments of the present invention described herein.

A yet another unique aspect of the present invention is the use of informative indicia 250 and 300. As shown in FIG. 7, in one embodiment, informative indicia 250, can be, but is not limited to, a logo or other similar indicia that denotes the manufacturer of the detachable documentation holder system 350 (FIGS. 8-10). In this manner, if the law enforcement officer spots the informative indicia 250 on the detachable documentation holder system 350 and the law enforcement officer has been made aware that the detachable documentation holder system 350 is used to removably retain documentation 200 that the law enforcement officer is requesting from the driver, the law enforcement officer may be less likely to become apprehensive about the movements of the driver if the law enforcement officer observes the driver reaching towards the detachable documentation holder system 350 when the law enforcement officer requests the documentation 200 from the driver.

Regarding the informative indicia 300, the case 152 can also include conventional reflective tape or other similar devices. In this manner, the informative indicia 300 is used to provide another way in which the law enforcement officer can be informed that the detachable documentation holder system 350 has been installed in the automobile that the law enforcement officer has pulled over and indicate that the detachable documentation holder is not a weapon.

An even further unique aspect of the present invention is the use of detachable documentation holder system sensors 170*a* and 170*b*. In particular, in order to prevent the owner (or driver) from forgetting the documentation 200 in the vehicle, the dock assembly 2 and case assembly 150 will have corresponding sensors 170*a* and 170*b* (FIG. 1), respectively, that indicate whether the case assembly 150 is still docked once the vehicle is turned off. A battery pack (not shown) in the case assembly 150 will provide power to speakers (not shown) to sound an alarm if the case assembly 150 is still docked. The alarm will sound until the case assembly 150 is removed from the dock assembly 2. The batteries will charge through a plug in the auxiliary power outlet (DC 12V), or USB port if available.

Construction of Detachable Documentation Holder System

To construct detachable documentation holder system 350, attention is directed to FIGS. 1-9. In particular, as shown in FIGS. 5 and 6, documentation 200 is located within slot 158 along the direction of arrow X.

As shown in FIGS. 8 and 9, the dock assembly 2 is located within slot 156. In this manner, the dock assembly 2 (in particular, the dock base 4 is located over the documentation 200 so that the documentation 200 is not visible while being retained within the case assembly 150.

As further shown in FIGS. 8 and 9, the stock assembly 50 is attached to the dock assembly 2. In particular, the slot 54 is attached to the post 10 so that the raised areas 53 interact with the raised areas 12. In this manner, the orientation of the dock assembly 2 can be adjusted (along the directions of arrows c) with respect to the stock assembly 50. A unique aspect of the present invention is that the interaction between the raised areas 53 and 12 allow the dock assembly 2 to be adjusted with respect to the stock assembly 50, but also allow the dock assembly 2 to remain in the desired position with respect to the stock assembly 50.

Once the case assembly 150 is attached to the stock assembly 50, the stock assembly 50 is also attached to the clip assembly 100. In particular, slot 62 is attached to the post 104 so that the raised areas 63 interact with the raised areas 106. In this manner, the orientation of the stock assembly 50 can be adjusted (along the directions of arrows a) with respect to the clip assembly 100. A unique aspect of the present invention is that the interaction between the raised areas 63 and 106 allow the stock assembly 50 to be adjusted with respect to the clip assembly 100, but also allow the stock assembly 50 to remain in the desired position with respect to the clip assembly 100.

Once the stock assembly 50 has been attached to the clip assembly 100, the detachable documentation holder system 350 is ready to be removably attached to a desired location such as an air vent, a dashboard, or other similar location on an automobile.

Second Embodiment of a Detachable Document Holder System

Figure 11:
FIG. 11 is an isometric, front view of another embodiment of a detachable documentation holder system, according to various embodiments of the present invention described herein.
Figure 12:
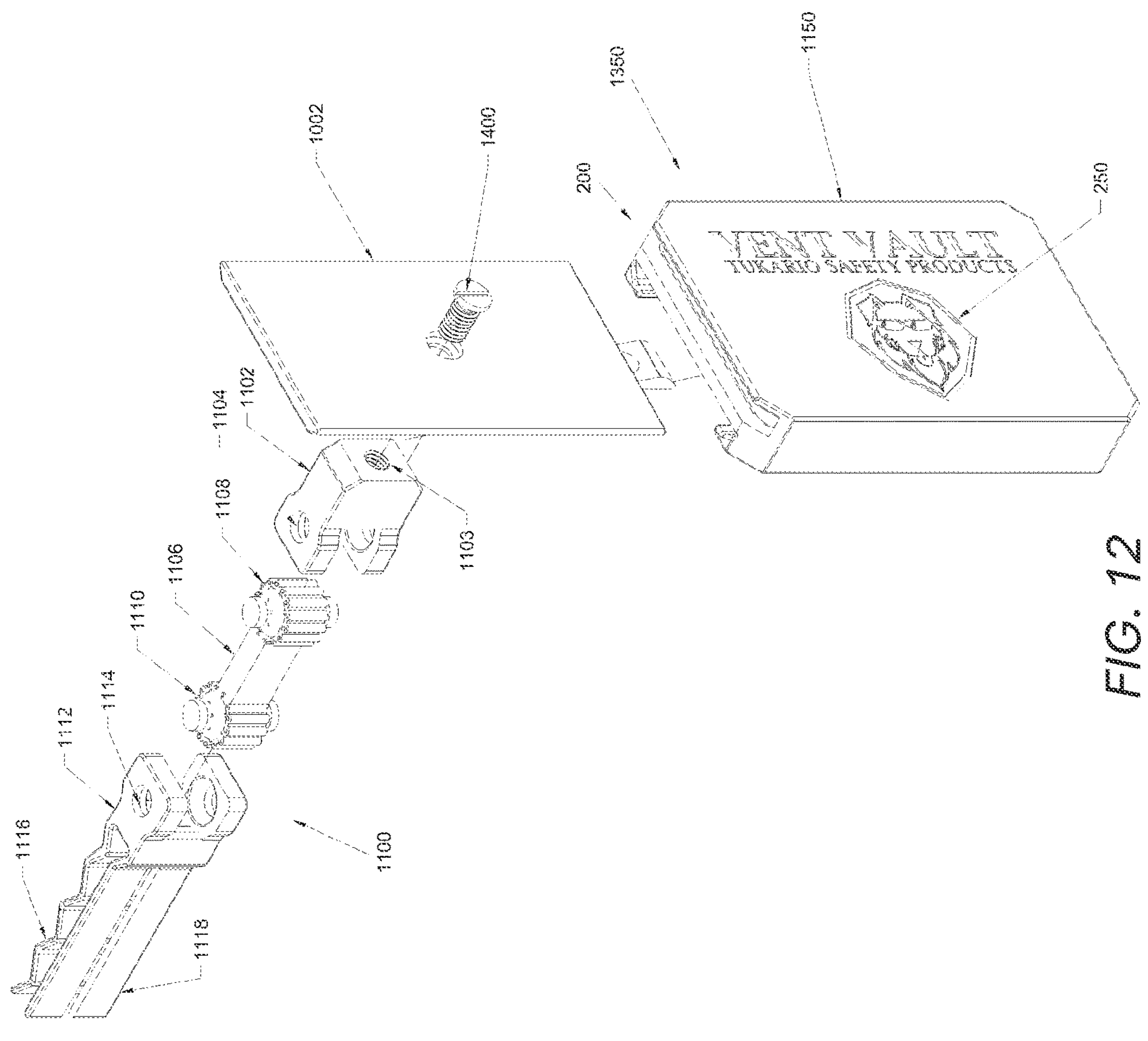
FIG. 12 is an exploded view of the another embodiment of a detachable documentation holder system, according to various embodiments of the present invention described herein.

With respect to FIGS. 11-30, there is shown another embodiment of a detachable documentation holder system 1350. In particular, as shown in FIGS. 11 and 12, detachable documentation holder system 1350 includes, in part, documentation 200, dock assembly 1002, clip assembly 1100, case assembly 1150, indicia 250, and fastener 1400. It is to be understood that documentation 200 and indicia 250 are similar to documentation and indicia 250, as discussed earlier.

Case Assembly

In particular, as shown in FIGS. 13-17A, there is illustrated a case assembly 1150. In particular, case assembly 1150 is constructed of any suitable, durable, high strength, rust resistant, UV resistant, lightweight material such as a polymeric or metallic material. Furthermore, in one embodiment, case assembly 1150 is constructed using conventional techniques such as 3-D printing, molding, forming, grinding, or the like. In one embodiment, case assembly 1150 could be constructed of a brightly colored (i.e., neon colored) material in order to further increase visibility of the case assembly 1150.

As shown in FIGS. 13-17A, in one embodiment, case assembly 1150 includes, in part, case 1152, case opening 1153, slots 1154, slot 1156, opening 1158, curved leaf springs 1160A and 1160B, dock catch protrusion 1162, and document receiving recess 1164. It is to be understood that documentation 200 is to be located under curved leaf springs 1160A and 1160B and retained within document receiving recess 1164. It is to be further understood that documentation 200 can be, but is not limited to, a conventional driver's license, a conventional automobile insurance card, a conventional automobile registration, conventional medical cards, or the like.

Figures 13, 14, 14A, 15, 16:
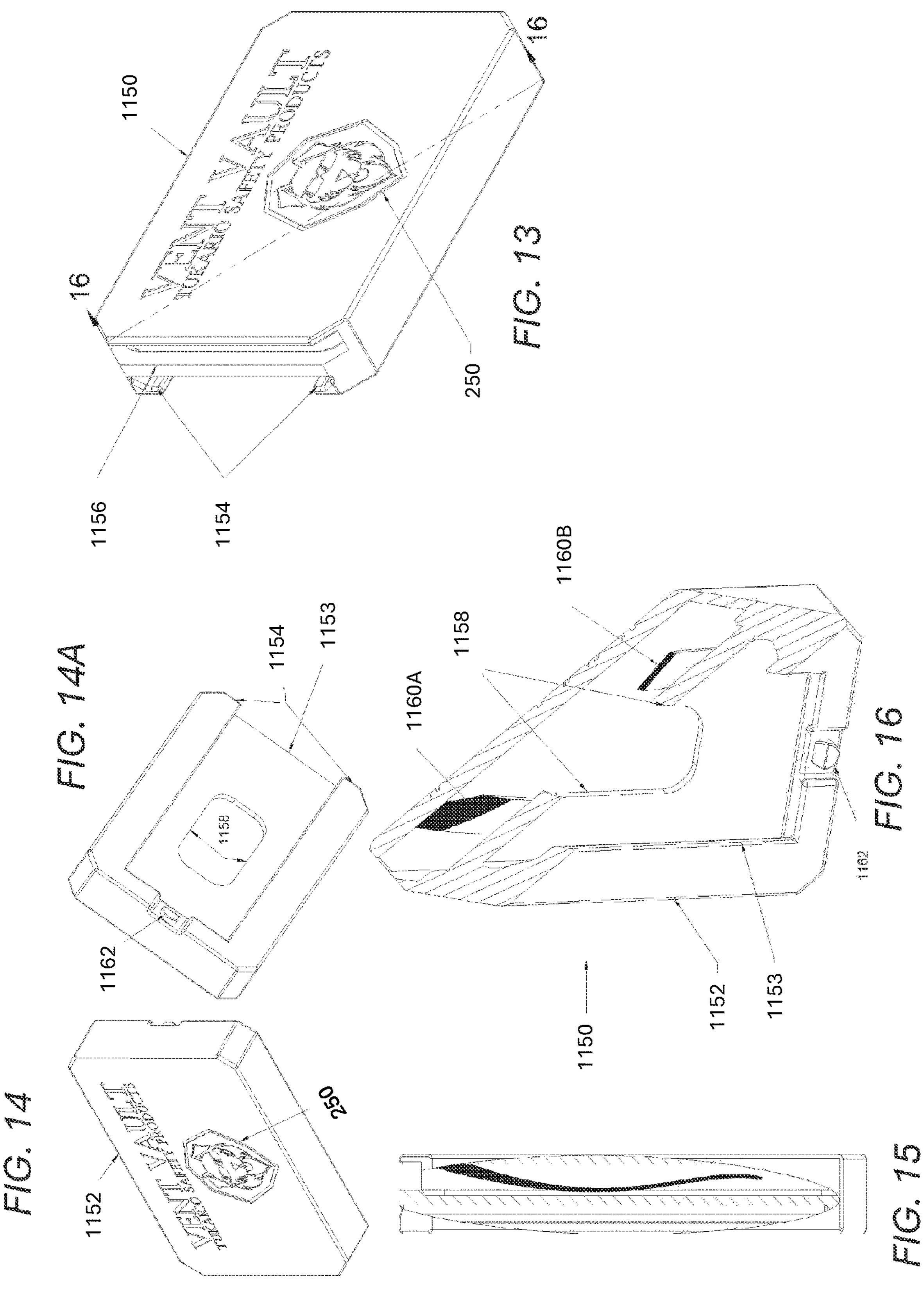

A unique aspect of the present invention is the use of curved leaf springs 1160A and 1160B and document receiving recess 1164. Curved leaf springs 1160A and 1160B are each attached at one end to case 1152 near the top of slot 1156 into which documentation 200 is placed into the case assembly 1150. In this manner, the curved leaf springs 1160A and 1160B interact with document receiving recess 1164 in order to securely retain the documentation 200 within case assembly 1150 as shown in FIGS. 15 and 15A.

A unique aspect of the present invention is the use of case opening 1153 and slots 1154. As will be discussed in greater detail later, slots 1154 are sized and shaped to allow base 1004 of dock assembly 1002 (FIGS. 12 and 18) to be removably retained within slots 1154. In this manner, dock assembly 1002 can be removably attached to the case assembly 1150. Opening 1153 allows the user to see if base 1004 has been properly inserted into slots 1154.

Another unique aspect of the present invention is the use of slot 1156. Slot 1156 is sized and shaped to be able to removably retain the documentation 200 within slot 1156 (FIGS. 15 and 15A). It is to be understood that slot 1156 should be constructed so that the documentation 200 can be easily and quickly inserted into and removed from the slot 1156 (FIG. 11) along the directions of arrows X (FIG. 11).

A yet another unique aspect of the present invention is the use of informative indicia 250. As shown in FIG. 11, in one embodiment, informative indicia 250, can be, but is not limited to, a logo or other similar indicia that denotes the manufacturer of the detachable documentation holder system 1350. In this manner, if the law enforcement officer spots the informative indicia 250 on the detachable documentation holder system 1350 and the law enforcement officer has been made aware that the detachable documentation holder system 1350 is used to removably retain documentation 200 that the law enforcement officer is requesting from the driver, the law enforcement officer may be less likely to become apprehensive about the movements of the driver if the law enforcement officer observes the driver reaching towards the detachable documentation holder system 1350 when the law enforcement officer requests the documentation 200 from the driver.

Another unique aspect of the present invention is opening 1158. In particular, opening 1158 is for the user to apply their thumb to any documentation 200 inside to slide it out of the case assembly 1150. Pressing down on the documentation 200 presses the documents 200 against the curved leaf springs 1160A and 1160B, then applying force in the direction of the slot 1156 will slide the documentation 200 out.

Another unique aspect of the present invention is the use of dock catch protrusion 1162. As will be described in greater detail later, dock catch protrusion 1162 is used to assist in being able to removably attach the dock assembly 1002 to the case assembly 1150. In one embodiment dock catch protrusion 1162 interacts with the opening 1010 in dock thumb tab 1008 (FIGS. 20 and 21) in order to removably secure the dock assembly 1002 to the case assembly 1150.

Dock Assembly

As shown in FIGS. 18-21, there is illustrated a dock assembly 1002. Dock assembly 1002 is constructed of any suitable, durable, high strength, rust resistant, UV resistant, lightweight material such as a polymeric or metallic material. Furthermore, in one embodiment, the dock assembly 1002 is constructed using conventional techniques such as 3D-printing, molding, forming, grinding, or the like. In one embodiment, the dock assembly 1002 could be constructed of a brightly colored (i.e., neon colored) material to further increase visibility of the dock assembly 1002. Furthermore, the dock assembly 1002 (in particular, the dock base 1004 is located over the documentation 200 so that the documentation 200 is not visible while being retained within the case assembly 1150.

Figures 18, 19, 20, 21:
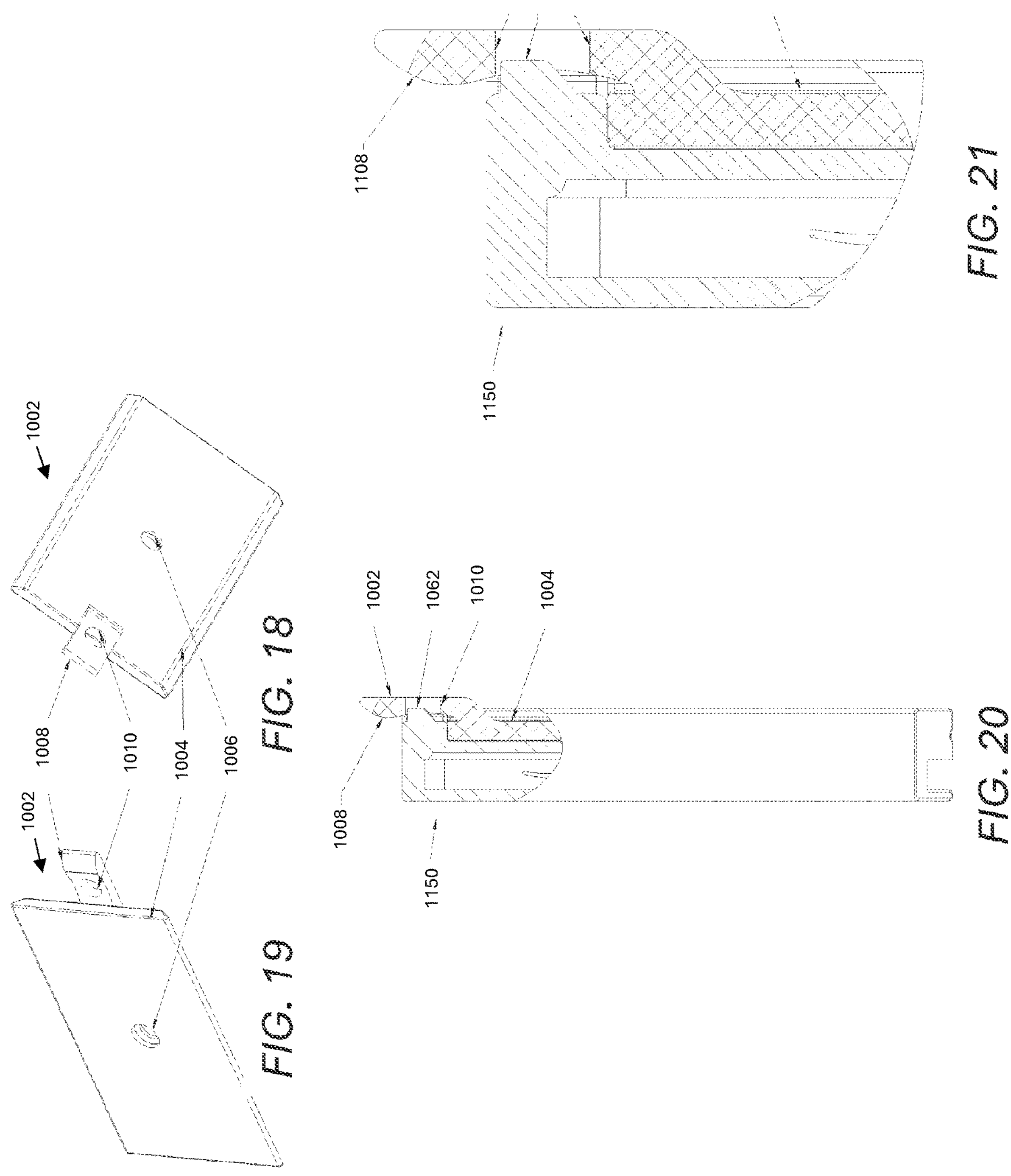
FIG. 18 is an isometric, front view of a dock assembly for another embodiment of a detachable documentation holder system, constructed according to various embodiments of the present invention described herein.
FIG. 19 is an isometric, rear view of the dock assembly for a detachable documentation holder system, constructed according to various embodiments of the present invention described herein.
FIG. 20 is a cross-sectional view of the case assembly being attached to the dock assembly of another embodiment for a detachable documentation holder system, taken along line 20-20 in FIG. 11, according to various embodiments of the present invention described herein.
FIG. 21 is a close-up view of the case assembly being attached to the dock assembly of another embodiment for a detachable documentation holder system, as shown in FIG. 20, according to various embodiments of the present invention described herein.

As shown in FIGS. 18 and 19, in one embodiment, dock assembly 1002 includes, in part, base 1004, opening 1006, and dock thumb tab 1008 having opening 1010. As will be discussed in greater detail later, opening 1006 is sized and shaped so that fastener 1400 (FIGS. 12 and 30) can be used to secure clip assembly 1100 (or 1100A) to case assembly 1150.

A unique aspect of the present invention is the use of dock thumb tab 1008 having opening 1010. As discussed earlier, in one embodiment dock catch protrusion 1162 interacts with the opening 1010 in dock thumb tab 1008 (FIGS. 20 and 21) in order to removably secure the dock assembly 1002 to the case assembly 1150.

Clip Assembly

In particular, as shown in FIGS. 12 and 23-25, there is illustrated a clip assembly 1100. In particular, clip assembly 1100 is constructed of any suitable, durable, high strength, rust resistant, UV resistant, lightweight material such as a polymeric or metallic material. Furthermore, in one embodiment, the clip assembly 1100 is constructed using conventional techniques such as 3D printing, molding, forming, grinding, or the like. In one embodiment, the clip assembly 1100 could be constructed of a brightly colored (i.e., neon colored) material in order to further increase visibility of the clip assembly 1100.

Figure 24:
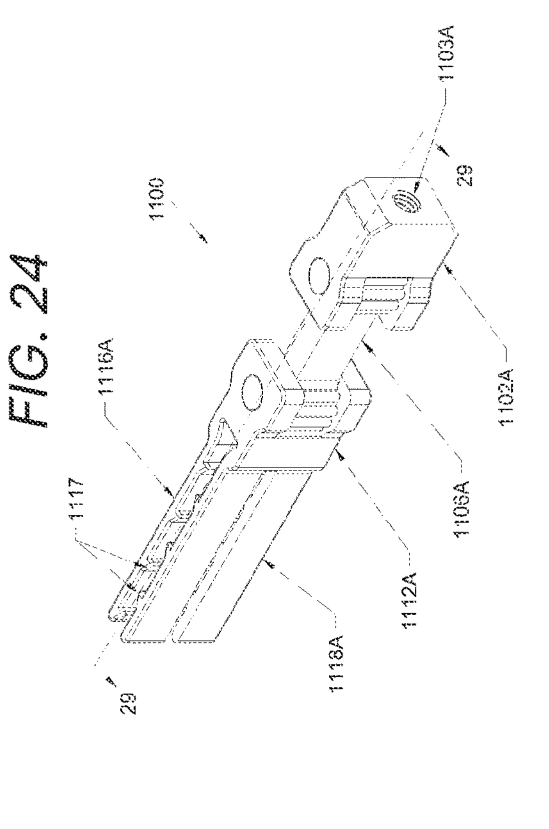
FIGS. 24 and 25 are isometric views of another embodiment of a clip assembly for another embodiment of a detachable documentation holder system, according to various embodiments of the present invention described herein.
Figure 25:
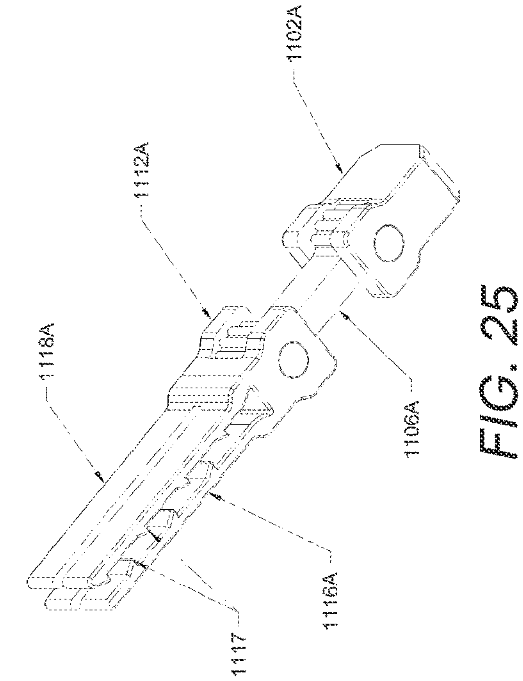
Figure 22:
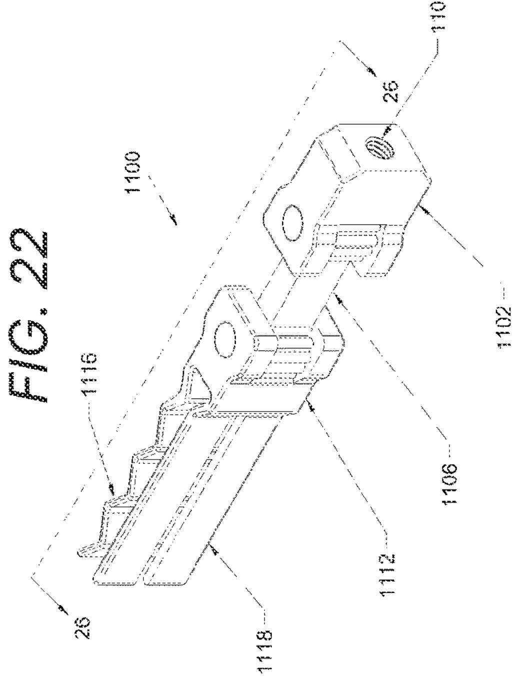
FIGS. 22 and 23 are isometric views of one embodiment of a clip assembly for another embodiment of a detachable documentation holder system, according to various embodiments of the present invention described herein.
Figure 23:
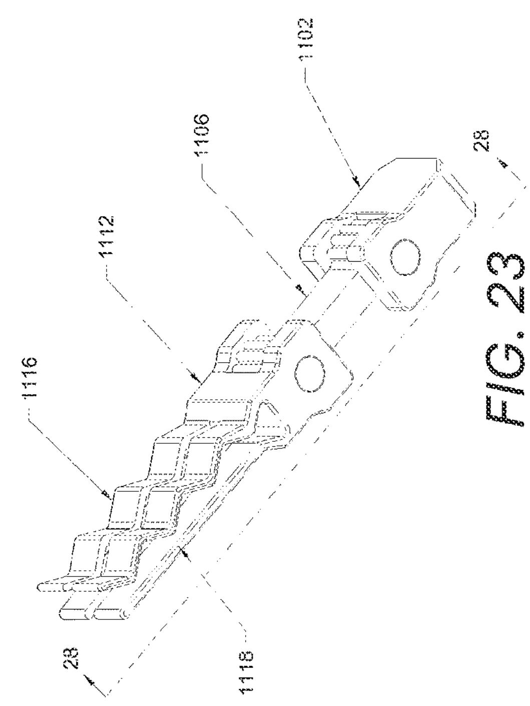

As shown in FIGS. 12, 22, and 24, in one embodiment, clip assembly 1100 (and clip assembly 1100A) includes, in part, connector 1102 (and 1102A), extension 1106 (and 1106A), connector 1112 (and 1112A), clip arm 1116 (and 1116A), and straight clip arm 1118 (and 1118A).

Figures 26, 27, 28, 29:
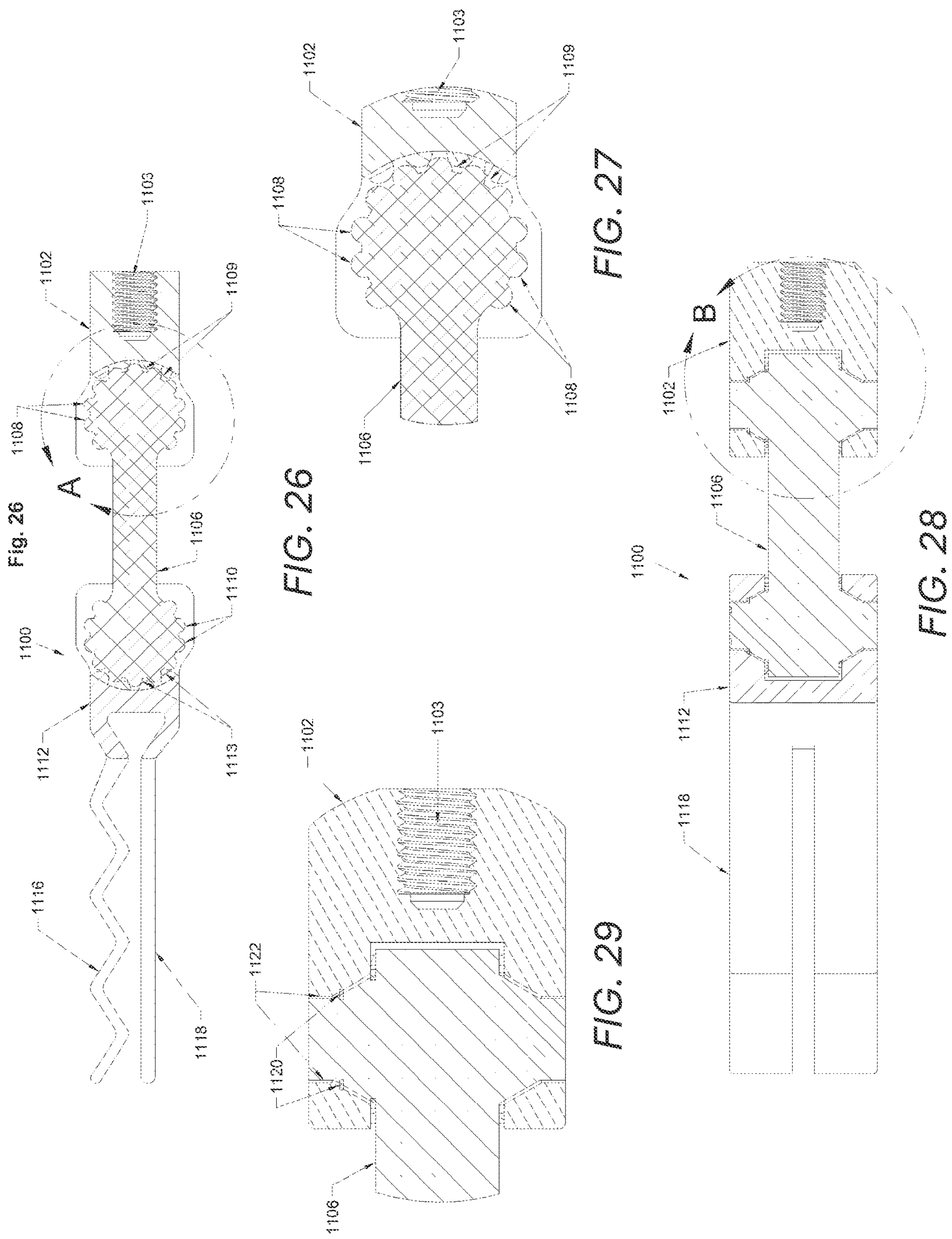
FIG. 26 is a cross-sectional view of the one embodiment of the clip for the another embodiment for a detachable documentation holder system, taken along line 26-26 in FIG. 22, according to various embodiments of the present invention described herein.
FIG. 27 is a close-up view of the breakaway supports of the clip assembly for another embodiment for a detachable documentation holder system, as shown in circled area A in FIG. 26, according to various embodiments of the present invention described herein.
FIG. 28 is a cross-sectional view of the one embodiment of the clip for another embodiment for a detachable documentation holder system, taken along line 28-28 in FIG. 23, according to various embodiments of the present invention described herein.
FIG. 29 is a close-up view of the breakaway supports of the clip assembly for another embodiment for a detachable documentation holder system, as shown in circled area B in FIG. 28, according to various embodiments of the present invention described herein.

It is to be understood that there are two (2) different embodiments of clip assembly 1110 (and clip assembly 1110A) shown in FIGS. 22-25. For the most part, clip assembly 1110 and 1110A are constructed in a similar manner. However, clip assembly 1110 includes an undulating clip arm 1116, and straight clip arm 1118. Conversely, clip assembly 1110A includes a straight clip arm 1116 having raised areas 1117 and straight clip arm 1118 having raised areas 1117. A unique aspect of the two (2) different embodiments of clip assembly 1110 and 1110A is that they provide the user with the ability to select the clip assembly 1110 or 1110A that will be able to more easily and quickly secure the detachable documentation holder system 1350 to a desired location, as will be discussed in greater detail later With respect to FIGS. 26-29, there are illustrated several unique aspects of the clip assemblies 1100 and 1100A. It is to be understood that this discussion will apply equally to either clip assembly 1100 or 1100A. In particular, as shown in FIGS. 26 and 27, extension 1106 includes gear teeth 1108 and 1110. Furthermore, connector 1102 includes gear teeth 1109 and connector 1112 includes gear teeth 1113.

A unique aspect of the present invention is the use of gear teeth 1108, 1109, 1110, and 1113. In particular, gear teeth 1110 interact with gear teeth 1113 in order to retain the extension 1006 in a desired orientation with respect to connector 1112. Gear teeth 1110 and gear teeth 1113 are sized and shaped so that there is a "friction fit" between the two (2) sets of teeth. If the orientation between extension 1006 and connector 1112 needs to be changed, the user simply pulls or pushes the extension 1006 with respect to connector 1112 which causes the gear teeth 1110 to move across gear teeth 1113 until the desired orientation between extension 1106 and connector 1112 is achieved. Once the desired orientation between extension 1106 and connector 1112 is achieved, the gear teeth 1110 will again be in a "friction fit" with gear teeth 1113.

With respect to gear teeth 1108 and 1009, gear teeth 1108 interact with gear teeth 1109 in order to retain the extension 1006 in a desired orientation with respect to connector 1102. Gear teeth 1108 and gear teeth 1109 are sized and shaped so that there is a "friction fit" between the two (2) sets of teeth. If the orientation between extension 1006 and connector 1102 needs to be changed, the user simply pulls or pushes the extension 1006 with respect to connector 1102 which causes the gear teeth 1108 to move across gear teeth 1109 until the desired orientation between extension 1106 and connector 1102 is achieved. Once the desired orientation between extension 1106 and connector 1102 is achieved, the gear teeth 1108 will again be in a "friction fit" with gear teeth 1109.

Another unique aspect of the present invention is the use of break-away supports 1120 and arm cone gap 1122. As shown in FIG. 29, break-away supports 1120 allow for 3-D printing in place for connector 1102 and extension 1106. It is to be understood that similar break-away supports are used during the 3-D printing of the area where connector 1112 is located adjacent to extension 1106. Once connector 1102 or connector 1112 are rotated with respect to extension 1106, the break-away supports 1120 will break away and allow connectors 1102 and 1112 to rotate with respect to extension 1106.

With respect to arm cone gap 1122, as shown in FIG. 29, arm cone gap 1122 allows for 3-D printing production and rotation of extension 1106 with respect to connectors 1102 and 1112. Preferably, arm cone gap 1122 is a 0.02 mm gap that allows for 3-D printing without any of the movable parts to fuse together. The arm cone gap 1122 also allows for some horizontal movement of the extension 1106 when rotating with respect to connectors 1102 and 1112 and provides less resistance between the gear teeth 1108, 1109, 1110, and 1113 when rotational pressure is applied by the user.

Figure 30:
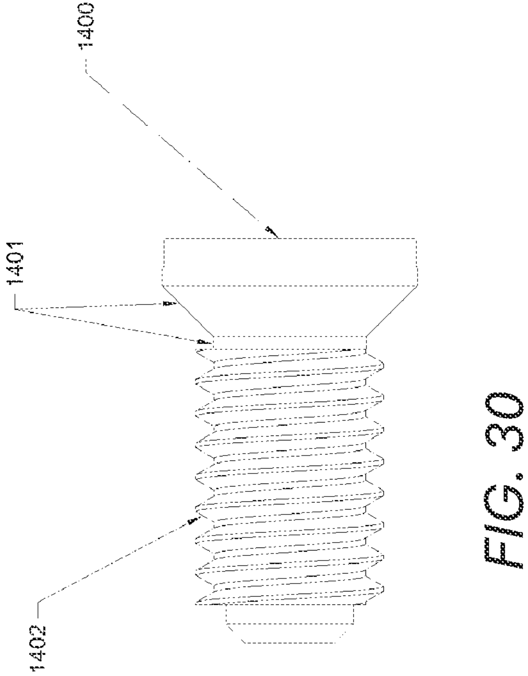
FIG. 30 is a side view of a dock screw for a detachable documentation holder system, according to various embodiments of the present invention described herein.

Another unique aspect of the present invention is the use of fastener 1400. As shown in FIG. 30, fastener 1400 includes a threaded area 1402. With respect to fastener 1400, it is designed for a smooth interface between the clip assemblies 1110 (or 1110A) and the dock assembly 1002. In particular, the fastener 1400 allows the dock assembly 1002 to freely rotate with respect to the clip assembly 1110 (or 1110A) without the user accidentally unscrewing the dock assembly 1002 from the clip assembly 1110 (or 1110A). In particular, the threaded area 1402 is designed specifically for 3D printing (to meet nozzle specifications of 0.40 mm layer thickness and layer heights of 0.10 mm). It is the screw shoulder 1402 and chamfer of 1401 that are specifically designed to match the connecting hole 1006 in the dock assembly 1002. The shoulder 1402 and chamfer 1401 are designed to match the exact dimensions of the dock assembly 1002 thickness+0.2 mm gap which is, like the screw threads, restricted to the same physical limitations of 0.40 mm layer thickness and 0.10 mm layer heights. This allows the dock assembly 1002 to seat tightly with the fastener 1400 so that dock assembly 1002 does not come off, but the 0.2 mm gap allows dock assembly 1002 to rotate without so much friction that it can be unscrewed without a tool.

Construction of Detachable Documentation Holder System

In order to construct detachable documentation holder system 1350, attention is directed to FIGS. 11-30. In particular, as shown in FIG. 11, the documentation 200 is located within slot 1156 along the direction of arrows X.

As shown in FIGS. 11, 18 and 21, the dock assembly 1002 is located within slots 1154. In this manner, the dock assembly 1002 (in particular, the dock base 1004 is located over the documentation 200 so that the documentation 200 is not visible while being retained within the case assembly 1150.

Figure 12A:
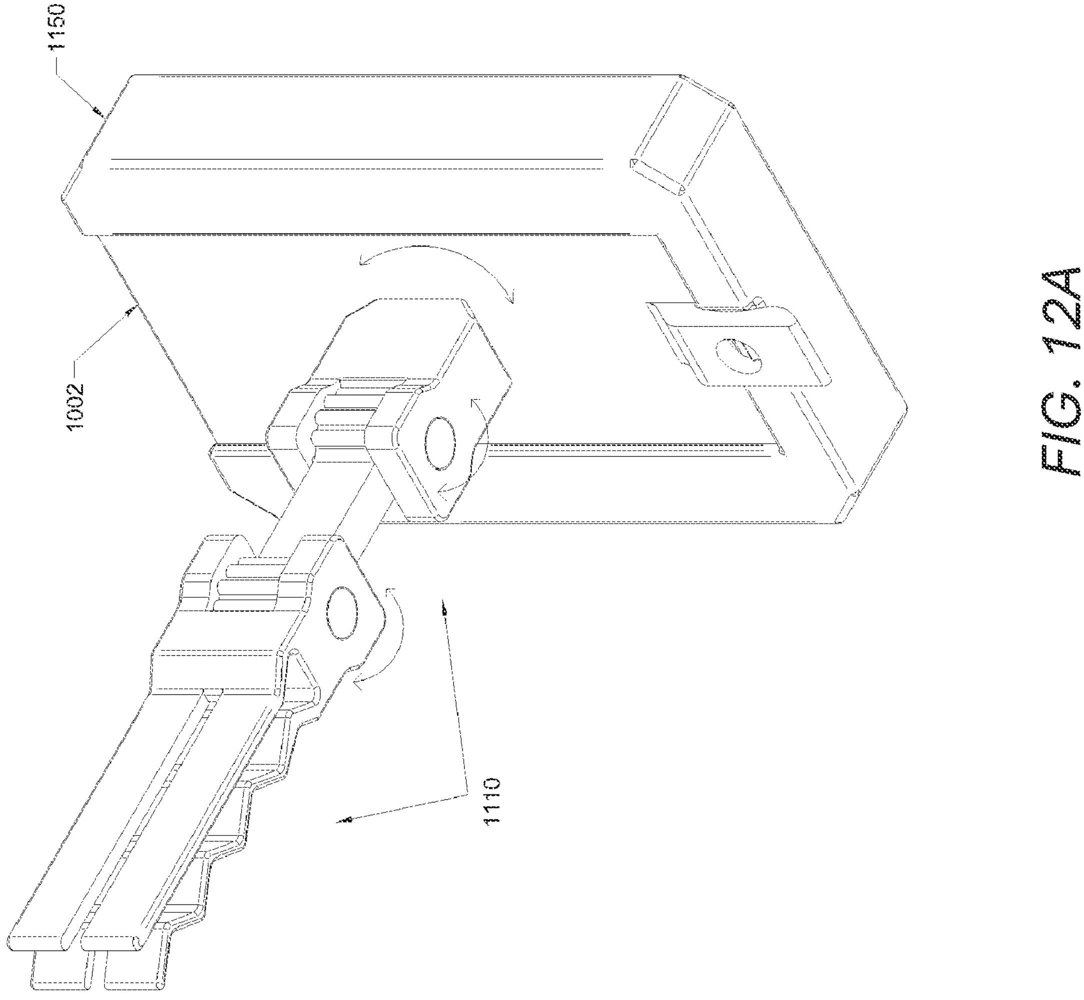
FIG. 12A is another rear view of the embodiment of a detachable documentation holder system, according to various embodiments of the present invention described herein.

As further shown in FIGS. 12 and 12A, clip assembly 1110 (or 1110A) is attached to the dock assembly 1002. In particular, the connector 1102 is attached to dock base 1004 through the use of fastener 1400. In this manner, the orientation of the dock assembly 1002 can be adjusted with respect to the clip assembly 1110 (or 1110A). A unique aspect of the present invention is that the interaction between the gear teeth 1110 and gear teeth 1113 and gear teeth 1008 and gear teeth 1009 allow the dock assembly 1002 to be adjusted with respect to the clip assembly 1110 (or 1110A), but also allow the dock assembly 1002 to remain in the desired position with respect to the clip assembly 1110 (or 1110A).

As discussed above, a unique aspect of the present invention is the use of gear teeth 1108, 1109, 1110, and 1113. In particular, gear teeth 1110 interact with gear teeth 1113 in order to retain the extension 1006 in a desired orientation with respect to connector 1112. Gear teeth 1110 and gear teeth 1113 are sized and shaped so that there is a "friction fit" between the two (2) sets of teeth. If the orientation between extension 1006 and connector 1112 needs to be changed, the user simply pulls or pushes the extension 1006 with respect to connector 1112 which causes the gear teeth 1110 to move across gear teeth 1113 until the desired orientation between extension 1106 and connector 1112 is achieved. Once the desired orientation between extension 1106 and connector 1112 is achieved, the gear teeth 1110 will again be in a "friction fit" with gear teeth 1113.

With respect to gear teeth 1108 and 1009, gear teeth 1108 interact with gear teeth 1109 in order to retain the extension 1006 in a desired orientation with respect to connector 1102. Gear teeth 1108 and gear teeth 1109 are sized and shaped so that there is a "friction fit" between the two (2) sets of teeth. If the orientation between extension 1006 and connector 1102 needs to be changed, the user simply pulls or pushes the extension 1006 with respect to connector 1102 which causes the gear teeth 1108 to move across gear teeth 1109 until the desired orientation between extension 1106 and connector 1102 is achieved. Once the desired orientation between extension 1106 and connector 1102 is achieved, the gear teeth 1108 will again be in a "friction fit" with gear teeth 1109.

After the dock assembly 1002 is attached to the clip assembly 1110 (or 1110A), the dock assembly 1002 is also attached to the case assembly 1150. In particular, the dock base 1004 is attached to the slots 1154 on the case assembly 1150.

Once the dock assembly 1002 is attached to the case assembly 1150, the detachable documentation holder system 1350 is ready to be removably attached to a desired location such as an air vent, a dashboard, or other similar location on an automobile.

Using the Detachable Documentation Holder System

With respect to using the detachable documentation holder system 350 (or 1350), attention is directed to FIG. 1-30. As discussed earlier; in order to use the detachable documentation holder system 350 (or 1350), the end user inserts the documentation 200 into the slot 158 (or slot 1156) along the directions of arrow X (FIG. 5 or 11). The end user then locates the dock assembly 2 within slot 156 (or dock assembly 1002 within slots 1154) so that the dock assembly 2 (or 1002) is located substantially over the documentation 200. In this manner, the documentation 200 is not visible.

The end user then determines a desired retaining surface location for removably attaching the detachable documentation holder system 350 (or 1350). As shown in FIG. 10, in one embodiment, the detachable documentation holder system 350 (or 1350) can be removably attached to air vents 402 (or other suitable locations in the automobile 404) located throughout the automobile 404.

Once the detachable documentation holder system 350 (or 1350) has been located within the automobile 404, the end user can then adjust an orientation and position of the detachable documentation holder system 350 (or 1350), as discussed earlier. It is to be understood that if the end user desires to attach the detachable documentation holder system 350 (or 1350) to a different location within the automobile 404, the end user can simply pull on the detachable documentation holder system 350 (or 1350) so that the clips 108 and 110 (or clips 1116, 1118, 1116A or 1118A) become disengaged from the air vent 402. The end user then attaches the clips 108 and 110 (or clips 1116, 1118, 1116A or 1118A) to the desired retaining surface location such as a different air vent 402.

As discussed earlier, the detachable document holder system 350 (or 1350) is used to retain the documentation 200 such a driver's license, an automobile insurance card, an automobile registration, medical cards, or the like so that the documentation 200 can be easily stored, accessed, and presented to the proper authorities upon request or the documentation 200 can be easily accessed by the proper authorities if the end user is incapacitated and is not able to access the documentation 200.

While it has not been mentioned, one familiar with the art would realize that the device is not limited by the materials used to create each apparatus that comprises the invention. Any other material type can comprise some or all of the elements in constructing a detachable document holder system in various embodiments of the present invention.

Although the present invention has been illustrated and described herein with reference to preferred embodiments and specific examples, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. A detachable documentation holder system, comprising:

a case assembly, wherein the case assembly includes documentation removably retained within the case assembly;

a dock assembly removably connected to one side of the case assembly, wherein the dock assembly is located over the documentation so that the documentation is not visible while being retained within the case assembly; and an adjustable clip assembly operatively connected to a first side of the dock assembly, wherein the adjustable clip assembly further comprises;

a first connector, an extension having a first end and a second end, wherein the first end of the extension is rotatably connected to the first connector, and a second connector, wherein the second connector is rotatably connected to the second end of the extension; and first and second clip arms operatively connected to the second connector.

2. The detachable documentation holder system, according to claim 1, wherein the dock assembly further comprises:

a base having a first side and a second side; and an opening located on the base, wherein the adjustable clip assembly is operatively connected to the first side of the base at the opening.

3. The detachable documentation holder system, according to claim 2, wherein the dock assembly further comprises:

a dock thumb tab located at one end of the base; and an opening located on the dock thumb tab.

4. The detachable documentation holder system, according to claim 1, wherein the adjustable clip assembly further comprises:

a plurality of first gear teeth located around a periphery of one end of the first connector;

a plurality of second gear teeth located around a periphery of the first end of the extension, wherein the plurality of first gear teeth interact with the plurality of second gear teeth;

a plurality of third gear teeth located around a periphery of one end of the second connector; and a plurality of fourth gear teeth located around a periphery of the second end of the extension, wherein the plurality of third gear teeth interact with the plurality of fourth gear teeth.

5. The detachable documentation holder system, according to claim 3, wherein the case assembly further comprises:

a case having a case opening;

a plurality of first slots located along second and third sides of the case, wherein the dock assembly is removably connected to the plurality of first slots;

a second slot located along one end of the case and located adjacent to the plurality of first slots, wherein the second slot is sized and shaped to retain the documentation;

a dock catch protrusion located at one end of the case, wherein the dock catch protrusion is configured to interact with the opening located on the dock thumb tab;

a plurality of springs located within the case; and a recess located within the case, wherein the recess is located adjacent to the plurality of springs and wherein the documentation is retained within the recess by the plurality of springs.

6. The detachable documentation holder system, according to claim 1, wherein the detachable documentation holder system further comprises:

indicia located on a portion of another side of the case assembly.

* * * * *